Oct. 10, 1950     F. A. GREENWALD ET AL     2,525,070
METHOD OF MANUFACTURING HIGH-HEAT RESISTANT DUCTS
Filed May 17, 1948
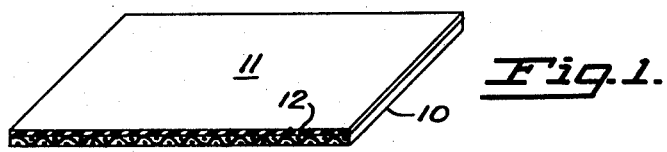
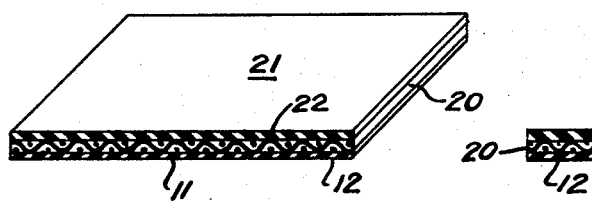
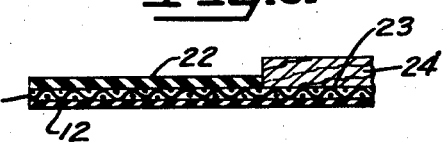
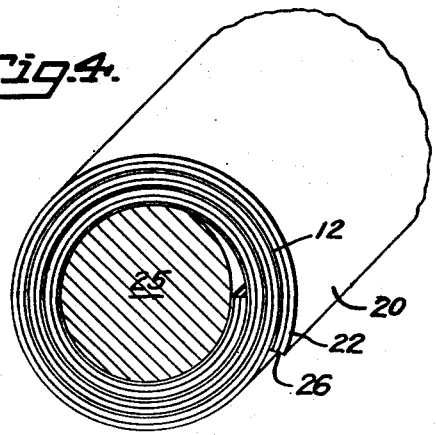
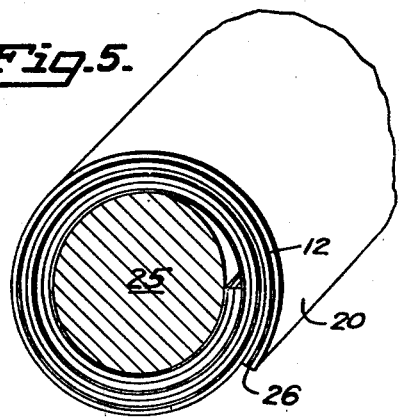
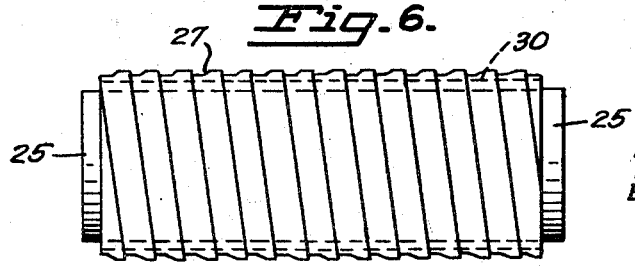
INVENTORS
FRED A. GREENWALD
JOHN W. WURTZ
BY
ATTORNEY Patented Oct. 10, 1950

2,525,070

UNITED STATES PATENT OFFICE 2,525,070

METHOD OF MANUFACTURING HIGH-HEAT RESISTANT DUCTS

Fred A. Greenwald, Southgate, and John W. Wurtz, San Gabriel, Calif., assignors to Arrowhead Rubber Co., Los Angeles, Calif., a corporation of California Application May 17, 1948, Serial No. 27,597

6 Claims. (Cl. 154—83)

This invention relates to an improved conduit or duct and to a method for its manufacture. It has particular reference to a duct for conducting high temperature gases. Still more particularly it pertains to a duct formed from a plurality of plies of heat-resistant fabric impregnated with silicone rubber.

Conduits heretofore used for the transfer of high temperature gases have had many disadvantages. Metal conduits, for example, are undesirable in airplanes where weight must be kept to a minimum and where space is at a premium. In addition to their relative heaviness and to the space taken up by the insulation necessary around metal ducts, the rigidity of metal ducts makes them difficult to install in cramped quarters. These disadvantages of metal ducts have led to much experimentation in the hope of producing a pliable, lightweight duct. Unfortunately, ducts of this type which have heretofore been produced have deteriorated when subjected to temperatures higher than about 400° F.

Successful lightweight ducts capable of withstanding temperatures in the range of 350°-550° F. have, so far as is known, never been produced, despite the availability of new basic materials capable of withstanding these temperatures: viz, glass cloth and silicone polymers. Absence from the commercial market, however, was not due to lack of demand, but rather because the methods which, for example, had produced neoprene-impregnated fabric ducts satisfactory in lower temperature ranges, had failed to produce a salable and acceptable duct when silicone polymer was the impregnating and bonding agent.

In the early attempts to manufacture ducts using silicone polymer, it was soon discovered that standard processing methods did not attach the glass fibers together where they crossed in the weave of the fabric. Therefore, when any diagonal force was exerted as by pulling the cloth on the bias, the glass cloth was pulled permanently out of shape. Where such characteristics were exhibited, it was found to be impossible to obtain a smooth, tight wrap on the mandrel when using the methods of duct fabrication which had worked with other elastomers. Again, the silicone was not tacky enough to hold a tight seam, and the duct could easily be broken open at the seam. Moreover, during curing, the silicone would penetrate through the interstices of the fabric and after the cure it would stick to the mandrel so that the duct could not be removed whole. Still further, since the duct could not be built on a bias, and since silicone has very poor tear resistance, the cured duct could not undergo the expansion which had conventionally been used for removing other synthetic rubber ducts from a mandrel.

The low degree of tack, the low tear resistance, the low tensile strength when uncured, the inability to resist deformation when uncured, and its complicated curing cycle which requires unusually high temperatures—all these properties of silicone combined to make the older methods useless and to cause general belief in the trade that silicone could not be used in a satisfactory duct.

One object of this invention is to solve the above problems.

Another object of the invention is to provide a satisfactory, light-weight, high-heat duct.

Another object of this invention is to provide a high heat duct which remains flexible over the temperature range from minus 70° F. to 550° F.

Another object of this invention is to provide a duct made of woven fabric impregnated with a rubber-like substance which will endure temperatures up to 550° F.

Another object of this invention is to provide a duct made from a woven fabric impregnated with silicone rubber.

Another object of this invention is to provide a duct made from glass cloth impregnated with a silicone rubber.

Another object of this invention is to provide a method by which a duct can be manufactured from fabric impregnated with silicone rubber.

Other objects and advantages of the invention will be apparent from the description which follows. In accordance with U. S. Revised Statutes, Section 4888, a specific embodiment is described in detail but the appended claims are not intended to be limited solely to this specific embodiment.

In the drawings:

Fig. 1 is a view in perspective of glass cloth upon which has been placed a thin layer of uncured silicone rubber (throughout the drawings, the thicknesses have been exaggerated);

Fig. 2 is a view in perspective of the same cloth after another layer of raw silicone rubber has been placed on its opposite side;

Fig. 3 is a view in elevation and in section of a sheet similar to that shown in Fig. 2, but in which a portion is covered and not coated;

Fig. 4 is a view in perspective, partly in section, of the impregnated and coated cloth formed into a tube about the mandrel;

Fig. 5 is a view similar to Fig. 4, in which the top layer of silicone has been scraped from the outside circumference of this tube; and Fig. 6 is a side view, showing cloth tape wound around the duct to hold it under pressure while it is being steam cured.

The new conduit or duct of this invention is composed of fabric and synthetic elastomer and is capable of withstanding high temperatures. Specifically, the duct is a multi-ply, unitary, high-heat duct made from glass cloth impregnated and bonded together with poly-siloxanes, more generally called silicone rubber.

The new fabricating method of the invention comprises applying a preliminary coat of elastomer to one side of a sheet of fabric and treating the coat to cause it to flow and thus to seal the openings in the weave of the fabric and to lose its tackiness. Then a bonding coating of uncured elastomer is applied to the other, previously uncoated side of the fabric, and the coated fabric is formed into tubular shape about a suitable shaping base, with the already-treated side of the fabric adjacent the base. The duct is cured to a set form by the application of heat.

Glass cloth and silicone rubber are used in the preferred method, which is illustrated in the drawings. A sheet 10 is coated on one side 11 with a very thin, continuous layer 12 of silicone rubber. Silicone rubbers are usually supplied in paste form and may be used as supplied or may be thinned by a light naphtha or by petroleum ether. The silicone may be spread on by a brush, swab, or any other convenient tool, to about the thickness of a heavy coat of wet paint. Fig. 1 illustrates diagrammatically (the thicknesses being greatly exaggerated) the status of the sheet 10 after the thin coating 12 has been applied.

After the thin coating 12 has been applied, it is precured—i. e., cured at least until it is no longer tacky or sticky. For silicone rubber a precuring time of about five minutes at a temperature between 480° F. and 600° F. is sufficient, though a longer time may be used; in fact, if desired, the precure may be carried to full cure. After the precure the state of the sheet 10 is as follows: one side 11 has been covered with a continuous, thin, pliable, preferably partly-cured and non-tacky layer 12 of silicone, and some of the glass fabric has been impregnated by the silicone which flowed through the interstices among the threads. Thereafter, the sheet 10 is hung up until it cools to a temperature at which it can be handled conveniently.

When the sheet 10 has cooled, it may be cut into pieces 20 of the desired size. Although the pieces 20 could have been cut to size earlier, it is more convenient to handle the fabric in large sheets during the earlier steps and a more uniform product results thereby. The size of an individual sheet 20 is determined by obvious calculations based upon the length, diameter, and number of plies of the duct into which it is to be made. Once the size is determined, the sheet 20 of impregnated cloth may be cut by ordinary pattern cutting machines and may be cut either parallel to the weave or on a bias.

The next stage in the process is to apply the main layer of silicone. The sheet 20 is placed on a work surface with its precured coating 12 down. On the sheet's upper previously uncoated surface 21 a thick coat 22 of silicone paste is applied. The coat 22 may cover the entire surface 21, as shown in Fig. 2, or a portion 23 may be covered by a block or jig 24, as shown in Fig. 3, so that subsequent removal of the rubber layer by scraping will be unnecessary (see below).

Before wrapping the coated sheet 20 about a mandrel 25, with the pre-cured side 11 in against the mandrel, the mandrel 25 preferably is dusted with soapstone to prevent later sticking and to make easier the removal of the cured duct.

After the sheet 20 has been wrapped around the mandrel 25, as shown in Fig. 4, the excess silicone is scraped off the exposed outside circumference of the sheet. If a portion was covered by the jig 24 (as in Fig. 3) the scraping will be unnecessary, except for cleaning off any material which oozes out from the edge 26 of the overlap. In either case, the sheet 20 will then appear as shown in the diagram of Fig. 5, where there is no outer coating 22 around the circumference of the wrapped sheet.

The roll is then placed under centripetal pressure on the mandrel 25 by wrapping around it a cloth tape 27, which presses the layers of the sheet 20 together so that they cohere and integrate into a unitary duct 30 during the curing operation.

With silicone the curing of a fabricated duct is often done in two stages, a first, precuring stage, and a second, final curing stage. The precuring may be done in a steam autoclave for about thirty minutes at normal pressure; or, under a pressure of about 25 p. s. i. of steam, it may be shortened to about 3 to 5 minutes. When precuring is completed the duct 30 is removed from the autoclave and since pressure is no longer required to hold the duct in shape, the wrapper 27 is removed.

Although the duct 30 may be cured to completion around the mandrel 25, it is more economical and preferable to remove it from the mandrel 25 and place it in a circulating-hot-air oven for from six to twenty-four hours at about 480° F. The longer the cure, the lower the percentage of compression set.

When it is taken out of the oven and cooled, the duct 30 is ready for use. It is still somewhat pliable, but will hold its cylindrical shape and is thoroughly bonded together. A silicone and glass duct of this type may be used freely with temperatures from minus 70° F. to plus 550° F. and when bonded with some types of silicone rubber, may withstand temperatures of almost 650° F.

In considering the method of manufacture, it should be noted that if there were no precured coat 12 on the inward side of the coated sheet 20 when it was wrapped around the mandrel 25, the uncured silicone rubber coat 22 would cause the coated sheet 20 to stick to the mandrel. This would be true even if the uncoated side were applied to the mandrel, because the silicone rubber runs when heat is applied and would permeate through between the glass fibers during the subsequent pressure curing of the duct. This permeating silicone material when cured would stick to the mandrel 25 and the fabricated duct could not be removed whole.

The steps of pre-coating and pre-curing give the duct 30 other important advantages. First, an even coat of silicone is obtained on the interior wall of the duct 30, the precured coat 12. Second, fiber glass cloth is loosely woven and tends to stretch badly out of shape, and the precured coat 12 sets the weave and holds it against stretching. Third, the pre-impregnation gives the cloth a body so that it can be more easily handled. Fourth, the duct is sealed more thoroughly by the fusing of the coats 12 and 22, It should also be noticed that because silicone has quite poor tear resistance, a single ply duct having only a slight overlap is easily broken by sharp bending or by internal pressure, whereas the multi-ply duct withstands any normal treatment.

Although this method is particularly adapted for the formation of silicone rubber ducts, it may also be used for the manufacture of ducts impregnated with other materials having similar characteristics.

We claim:

1. A method of manufacturing a duct from a sheet of fabric, which comprises the steps of coating said fabric on one side with an uncured elastomer, precuring said coating, coating the opposite side of said sheet with uncured elastomer, wrapping said sheet in multiple ply arrangement around a mandrel with the precured side of said fabric adjacent said mandrel, curing it there under pressure at least until bonded, and then curing to the desired compression set.

2. A method of manufacturing a duct from a sheet of fabric, which comprises the steps of coating said sheet on one side with uncured silicone rubber, precuring it, coating said sheet on the opposite side with uncured silicone paste, wrapping said sheet around a mandrel with the precured coating of said fabric adjacent said mandrel, precuring it there under pressure and subsequently curing it to the desired compression set.

3. A method of manufacturing a duct from a sheet of glass cloth, which comprises the steps of coating said sheet on one side with a paste of uncured silicone rubber, precuring it, coating said sheet on the opposite side with uncured silicone paste, wrapping said sheet around a mandrel with the precured coating of said fabric adjacent said mandrel, and curing it to the desired compression set.

4. A method of manufacturing a high-heat-resistant duct from a sheet of glass cloth which comprises the steps of coating said sheet on one side with an uncured silicone paste, curing it for about five minutes at a temperature between 500° F.–600° F., coating it on the opposite side with silicone paste, wrapping the coated glass cloth around a mandrel with the cured side adjacent said mandrel, precuring said sheet there under pressure until said sheet is bonded to itself and then completing the cure.

5. A method of manufacturing a high-heat-resistant duct from a sheet of glass cloth which comprises the steps of coating it on one side with an uncured silicone paste, curing it until said silicone is no longer tacky, coating it on the opposite side with uncured silicone paste, wrapping it around a mandrel with the non-tacky side against the mandrel, wrapping a cloth tape tightly around it, pre-curing it in steam under the pressure of said tape until it is bonded, removing said tape, and then curing said duct in hot air until the desired stiffness is obtained.

6. A method of manufacturing a heat-resistant, multi-ply duct from a sheet of glass cloth which comprises the steps of coating said sheet on one side with an uncured silicone paste, curing it for about 5 minutes at a temperature between 500° F. and 600° F., coating it on the opposite side with uncured silicone paste, wrapping it around itself over a mandrel with the cured side adjacent said mandrel, removing the excess silicone from the outside circumference of the tube thus formed, wrapping a cloth tape tightly around said tube, pre-curing it in steam under pressure, removing said tape, and then curing said tube in hot air at about 480° F. for from 6 to 24 hours, depending on the desired percentage of compression set.

FRED A. GREENWALD.
JOHN W. WURTZ.

REFERENCES CITED

The following references are of record in the file of this patent:

UNITED STATES PATENTS

| Number | Name | Date |
|---|---|---|
| 1,876,357 | Stadtfeld | Sept. 6, 1932 |
| 1,940,868 | Kennedy | Dec. 26, 1933 |
| 2,142,971 | Bierer | Jan. 3, 1939 |
| 2,142,972 | Bierer | Jan. 3, 1939 |
| 2,296,372 | Smith et al. | Sept. 22, 1942 |
| 2,383,733 | Parker | Aug. 28, 1945 |
| 2,434,465 | Marc | Jan. 13, 1948 |
| 2,492,498 | Pedersen | Dec. 27, 1949 |

OTHER REFERENCES

Modern Plastics, August 1945, vol. 22, pages 136–140, "Air Ducts on the B-29."